2,549,408

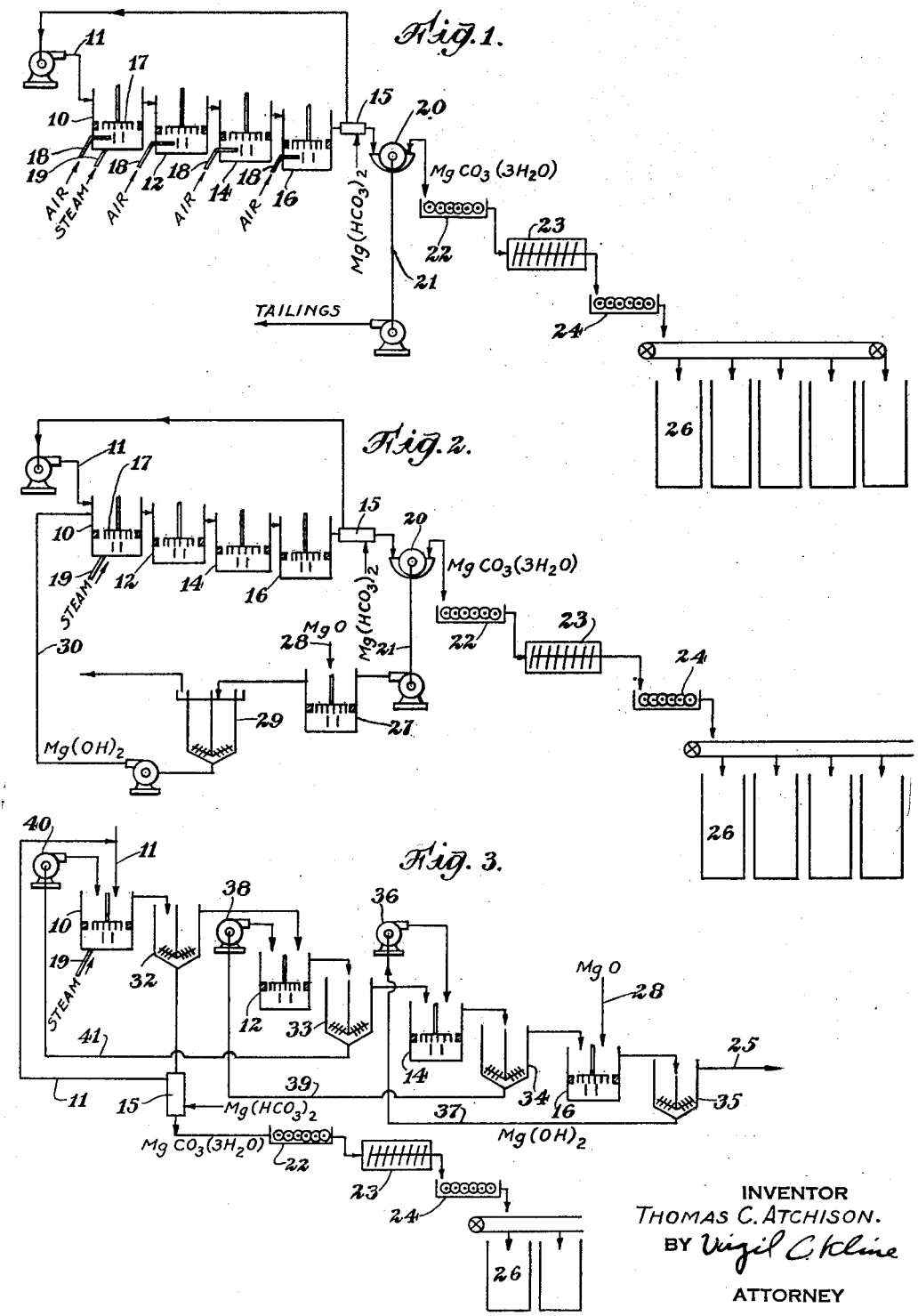
April 17, 1951     T. C. ATCHISON     2,549,408
MANUFACTURE OF NORMAL MAGNESIUM CARBONATE
Filed April 3, 1946
INVENTOR
THOMAS C. ATCHISON.
BY *Virgil C. Kline*
ATTORNEY Patented Apr. 17, 1951

UNITED STATES PATENT OFFICE 2,549,408

MANUFACTURE OF NORMAL MAGNESIUM CARBONATE

Thomas C. Atchison, Princeton, N. J., assignor to Johns-Manville Corporation, New York, N. Y., a corporation of New York Application April 3, 1946, Serial No. 659,343

2 Claims. (Cl. 23—67)

This invention relates to the manufacture of normal magnesium carbonate, and is particularly concerned with an improved method of producing a reactive form of normal magnesium carbonate.

Normal magnesium carbonate ($MgCO_3.3H_2O$) is a crystalline solid which occurs in needlelike orthorhombic crystals of varying length and thickness. A reactive form of normal magnesium carbonate comprises crystals averaging about 40 microns in length and 2–3 microns in thickness.

Normal magnesium carbonate has hydraulic setting properties. It has the property of developing cohesive and adhesive bonds while undergoing decomposition in situ to produce basic magnesium carbonate ($4MgCO_3.Mg(OH)_2.5H_2O$). The strengths of the bonds which are thus developed vary with the reactivity or average particle size of the normal carbonate crystals undergoing decomposition. In other words, the smaller and more uniform the crystal size the stronger the bonds developed.

Methods heretofore proposed and used for producing normal magnesium carbonate are not suited for the efficient production of finely divided reactive normal carbonate crystals. Most of such methods involve precipitation of normal carbonate crystals in large batch operations which develop large crystals of non-uniform size and low reactivity either initially, or by accretion growth of smaller crystals.

A primary object of the present invention is to provide an efficient method for producing normal magnesium carbonate which is reactive and of uniform small crystal size.

A feature of the invention involves the precipitation of normal magnesium carbonate crystals by decomposing magnesium bicarbonate solution while flowing such solution through a series of reaction pools, with strong agitation and continuous flow of materials, and while holding the temperatures of the reaction pools below 120° F. By carrying out the operation with a continuous flow of bicarbonate solution through a series of pools it is possible to maintain in each pool optimum conditions of agitation and temperature adjusted to a particular concentration of bicarbonate liquor and suspended solids present, thus making possible high yield production of normal magnesium carbonate crystals of uniform high reactivity. The concentration of normal magnesium carbonate builds up gradually from pool to pool, and the ultimate concentration of residual bicarbonate liquor is reduced to a low value. This multiple pool continuous flow method is adapted to production of a large total yield of reactive crystals because relatively smaller volumes of strongly agitated solution are treated, and because better control is possible of the conditions favorable to a high rate of formation of crystals in each pool. Without such control the yield would be roughly in proportion to the concentration of bicarbonate solution under treatment, and there would be less obvious improvement over batch operation in a single pool of sufficient size to include the volume of liquid treated in all of the pools of the series.

With the above and other objects and features in view, the invention consists in the improved method of manufacturing reactive normal magnesium carbonate which is hereinafter described and more particularly defined by the accompanying claims.

In the following description reference will be made to the attached sheet of drawings, in which:

Fig. 1 is a diagrammatic flow sheet of apparatus adapted for practicing one modification of the present method;

Fig. 2 is a diagrammatic assembly view of apparatus for practicing another modification of the method; and Fig. 3 portrays diagrammatically an assembly of apparatus units for practicing a preferred modification of the method.

The method which is practiced in all forms of the apparatus portrayed in the several figures is concerned with the manufacture of normal magnesium carbonate by decomposing dilute solutions of magnesium bicarbonate. In that modification of the method which is carried out in the apparatus portrayed in Fig. 1, normal carbonate is produced by subjecting bicarbonate solution, while in continuous flow, to conditions of heat, aeration and strong agitation, favoring decomposition and liberation of $CO_2$. In that modification of the method which is carried out in the apparatus portrayed in Fig. 2, decomposition of bicarbonate solution is effected by heat and agitation, and also by neutralization reactions between magnesium hydrates and bicarbonate solution. In that modification of the method which is carried out in the apparatus portrayed in Fig. 3, the flow of magnesium hydrate through the series of reaction pools is countercurrent to the direction of flow of bicarbonate solution through the pools.

In practicing the method, magnesium bicarbonate solution or liquor of say 1–3% concentration, is applied continuously to the first of a series of tanks or vessels 10 through a supply pipe 11. From tank 10 the bicarbonate liquor overflows continuously into another tank 12, and flows successively in turn through tanks 14 and 16.

The method is not dependent upon any particular source of supply of the magnesium bicarbonate liquor which is introduced to tank 10 through pipe 11. One of the most common sources of supply is the weak bicarbonate liquor which is produced by calcining dolomitic limestone to produce calcium and magnesium oxide, by slaking the oxides with water, and by carbonating the slaked oxides under conditions forming calcium carbonate precipitate and water soluble magnesium bicarbonate separable from the calcium carbonate by filtration.

That pool of bicarbonate solution which fills tank 10 (Fig. 1) is strongly agitated and aerated throughout by mounting a turbo-mixer 17 in the bottom of the tank and by continuously introducing air under pressure into the tank through the turbo-mixer by a compressed air supply pipe 18. The temperature of the solution within tank 10 is maintained at a predetermined optimum point not exceeding about 120° F., and preferably in the neighborhood of 100° F., by introducing steam through a supply pipe 19. The turbo-mixer is preferably a Duplex turbo-gas absorber type which operates to develop uniform flow of air upwardly through the solution in tank 10, while strongly agitating the solution, thereby promoting rapid decomposition of the magnesium bicarbonate solution with evolution of carbon dioxide gas, by maintaining conditions of reduced partial pressure of carbon dioxide within the solution. By continuously feeding fresh bicarbonate solution into the tank the concentration of bicarbonate solution in tank 10 is maintained at a fairly high value, and this condition favors precipitation of normal magnesium carbonate crystals at a rapid rate.

The concentration of normal magnesium carbonate crystals carried in suspension in the bicarbonate solution gradually builds up as the suspension or slurry passes in series from tank to tank. This build-up of concentration of normal magnesium carbonate favors ultimate decomposition of a large proportion of the total bicarbonate under treatment in the several tanks, because the heat decomposition of bicarbonate solution is promoted, rather than retarded, by the presence of normal magnesium carbonate crystals in the solution undergoing heat decomposition.

During passage of the bicarbonate solution in series through the pools which are maintained in tanks 10, 12, 14 and 16, the concentration of the bicarbonate solution is gradually lowered from say 2-3% to about ½% concentration by weight. The residual undecomposed bicarbonate liquor which is discharged from the last tank 16 in the series is separated from the normal carbonate crystals which it carries in suspension, as by passing the slurry through a vacuum filter 20 such as an Oliver filter. The filter is operated to build up the concentration of normal magnesium carbonate crystals trapped by the filter to a solids concentration of at least about 20% by weight, while discharging residual bicarbonate liquor filtrate through a pipe 21.

The wet concentrated normal magnesium carbonate filter cake which is trapped by the filter is preferably plasticized and homogenized by passing through a series of agitator conveyors 22, 23 and 24. The thus plasticized normal carbonate concentrate is then preferably aged by allowing it to stand quiescent for a period of 16-24 hours in aging tanks 26. This aging treatment has been found to improve the reactivity of the normal magnesium carbonate product.

Since it is desirable that the aging treatment carried out in tanks 26 should take place at temperatures not substantially above 80° F. to insure the production of a stable reactive product, the present method contemplates a cooling operation on the slurry at some point between the last of the series of reaction tanks and the aging tanks. In Fig. 1 this cooling operation has been shown as effected by passing the discharge slurry from tank 16 through a heat interchanger 15 in indirect transfer relation with the relatively concentrated cool bicarbonate liquor entering the system through pipe 11.

In that modification of the process which is illustrated in Fig. 2, each of the reaction tanks includes a turbo-mixer mounted in its base, but no provision is made for introducing compressed air into these tanks. Bicarbonate liquor is supplied to the first of the tanks 10 in a continuously flowing stream, and simultaneously a continuous supply of magnesia is delivered to this tank, as for example by supplying concentrated magnesium hydrate slurry through a feed pipe 30. Some of the normal magnesium carbonate which is precipitated in tank 10 results from heat decomposition of the bicarbonate solution. However, a major portion of the normal carbonate formed in this tank results from neutralization reactions between the added magnesia or magnesium hydrate and the bicarbonate liquor. The slurry of normal carbonate crystals in bicarbonate liquor which is discharged from the last of the series of reaction tanks portrayed in Fig. 2 may be immediately cooled, as by passage through an interchanger 15, and is then subjected to a separation treatment, as in a filter or thickener 20, for the purpose of recovering a concentrated wet mass of normal carbonate and of discharging waste dilute bicarbonate liquor.

Some of the waste bicarbonate liquor which is discharged from the filter 20 portrayed in Fig. 2, is preferably used as a carrier for introducing magnesia to the first reaction tank 10. Thus, this waste bicarbonate liquor is conducted from filter 20 to a turbo-mixer 27 into which active or caustic magnesia is introduced continuously at a controlled rate, as from a source of supply 28. A neutralization reaction takes place in mixer 27 between the added magnesia and the waste bicarbonate liquor, which further reduces the concentration of magnesium bicarbonate, and which results in the formation of some normal magnesium bicarbonate and precipitation thereof. The thus reduced bicarbonate liquor is separated from unreacted magnesia and precipitated normal magnesium carbonate crystals, as by means of a thickener 29, and the concentrated magnesia slurry is pumped to the magnesia inlet pipe 30 for tank 10.

In that modification of the apparatus which is shown in Fig. 3, each of tanks 10, 12, 14 and 16 is provided with a turbo-mixer 17, and between each pair of tanks is disposed a gravity settler or thickener. The slurry discharged from tank 10 flows into a thickener 32, and the bicarbonate liquor which is discharged overhead from tank 32 in turn enters tank 12. Slurry discharged from tank 12 enters a thickener 33, and the bicarbonate liquor overflowing from tank 33 enters tank 14. The slurry discharged from tank 14 enters a thickener 34 and the bicarbonate liquor overflow enters tank 16. Slurry discharge from tank 16 enters a thickener 35 and the bicarbonate liquor overflow from tank 35 is discharged through a pipe 25.

Magnesia or magnesium hydrate from a source of supply 28 is fed continuously at a controlled rate to the pool of dilute bicarbonate liquor in turbo-mixer 16. Neutralization reactions between the added magnesia and the bicarbonate liquor precipitate normal magnesium carbonate crystals in tank 16, and the slurry of normal magnesium carbonate crystals and unreacted magnesium hydrate which is discharged from tank 16 is concentrated in thickener 35, and is transferred from the base of thickener 35 by a pump 36 and feed pipe 37 in a continuously flowing stream, to the inlet of turbo-mixing tank 14. Neutralization reactions which take place in mixer 14 convert a substantial proportion of the bicarbonate liquor flowing therethrough to normal magnesium carbonate, and the slurry of normal magnesium carbonate and unreacted magnesia which is discharged from tank 14 is concentrated in thickener 34. From the base of thickener 34 this concentrated slurry is withdrawn through a pump 38 and is introduced continuously at a controlled rate by feed pipe 39 to the inlet of mixer 12. Neutralization reactions in mixer 12 produce a slurry having a high concentration of normal magnesium carbonate crystals and which may still contain some unreacted magnesia, and this slurry is concentrated in thickener 33. From the base of thickener 33 the concentrated slurry is transferred by pump 40 and pipe 41 to the inlet end of mixer 10. Neutralization reactions which take place in mixer 10 bring about complete reaction of any residual magnesia in the slurry originating in tank 16, so that the slurry discharge from tank 10 contains a high proportion of substantially pure normal magnesium carbonate crystals. This normal magnesium carbonate slurry is concentrated in thickener 32, and is discharged therefrom through a heat interchanger 15 and through plasticizing conveyors 22, 23, and 24 to an aging tank or tanks 26, wherein the slurry is allowed to age for a period of 16–24 hours at a temperature of approximately 80° F.

In carrying out that preferred modification of the method which is portrayed in Fig. 3, the waste bicarbonate liquor which leaves the system through the overflow discharge pipe 25 from thickener 35 has an exceptionally low concentration of recoverable magnesium carbonate, by reason of the neutralization reactions taking place in mixer 16 between the dilute bicarbonate liquor continuously entering this tank and the concentrated magnesia or magnesium hydrate. The magnesia or magnesium hydrate which enters the system from source 28 flows through the system in a direction which is generally countercurrent to the direction of flow of the magnesium bicarbonate through the system. Consequently the proportion of normal bicarbonate crystals carried by the reversely flowing slurry of magnesium hydrate builds up rapidly, as the slurry enters successively the mixing tanks 14, 12 and 10. The rate of feed of magnesia to the tank 16 is controlled to insure complete reaction of all of the added magnesia within the successively placed tanks 16, 14, 12 and 10, so that the slurry which is finally discharged from tank 10 contains no unreacted magnesia and has a high concentration of substantially pure normal magnesium carbonate. The concentration of this normal magnesium carbonate slurry is built up to a solids content of at least 20% by weight at the time of its discharge from thickener 32.

As the concentration of bicarbonate liquor decreases in flowing through the series of turbo-mixers 10, 12, 14 and 16, the tendency toward lower rates of production of normal magnesium carbonate in the successive mixers may be in part counteracted by controlled adjustment upwardly of the temperatures and degrees of agitation maintained in the mixers. This tendency toward lower rate of production in each successive pool is also counteracted by that preferred modification of the method which is portrayed in Fig. 3, in which flow of neutralizing magnesia slurry through the system is countercurrent in direction to the flow of bicarbonate liquor. Thus, the greatest concentration of caustic magnesia contacts the bicarbonate liquor of lowest concentration and effects decomposition of the waste bicarbonate liquor to a low final bicarbonate concentration. In all cases the final waste bicarbonate liquor is preferably recycled for reconcentration by the process producing the concentrated liquor on which the process operates.

Since many variations may be made from the illustrative details given, without departing from the scope of the invention, it is intended that the invention should be limited only by the terms of the claims interpreted as broadly as consistent with novelty over the prior art.

What I claim is:

1. In producing reactive normal magnesium carbonate the steps comprising, flowing a stream of magnesium bicarbonate solution continuously through a series of reaction pools, simultaneously feeding to each pool an aqueous slurry of magnesium hydrate, maintaining each pool at a temperature not exceeding about 120° F. while strongly agitating the same, thereby promoting reaction of the magnesium hydrate with the bicarbonate solution and precipitating normal magnesium carbonate crystals, gradually building up the concentration of normal magnesium carbonate crystals in the slurry as the decomposition proceeds through the successive pools, increasing the solids concentration of the resulting normal magnesium carbonate slurry while separating residual dilute bicarbonate liquor subjecting the concentrated slurry to a plasticizing treatment, and improving the reactivity of the normal magnesium carbonate product by allowing the plasticized slurry to age by quiescent standing at a temperature not substantially above 80° F.

2. In producing reactive normal magnesium carbonate the steps comprising, flowing a stream of magnesium bicarbonate liquor continuously through a series of reaction pools, maintaining each pool at a temperature not exceeding about 120° F. while strongly agitating the same, continuously feeding to the last pool in the series a measured amount of reactive magnesia, promoting neutralizing reaction of the magnesia with the bicarbonate liquor, thereby precipitating normal magnesium carbonate crystals, separating a concentrated slurry of the normal carbonate crystals and unreacted magnesium hydrate from residual bicarbonate liquor leaving the last pool in the series, introducing said slurry to the pool just ahead of the last pool in the series, repeating said countercurrent neutralization, precipitation and separation operations for each pool of the series, gradually building up the concentration of normal carbonate crystals in the slurry as the decomposition proceeds through the successive pools in the direction of counter-current slurry flow, and concentrating a slurry of substantially pure normal magnesium carbonate crystals flowing out of the first pool of the series while separating dilute residual bicarbonate liquor.

THOMAS C. ATCHISON.

REFERENCES CITED

The following references are of record in the file of this patent:

UNITED STATES PATENTS

| Number | Name | Date |
|---|---|---|
| 2,209,752 | Abrahams et al. | July 30, 1940 |
| 2,301,457 | Sadtler et al. | Nov. 10, 1942 |
| 2,390,095 | Gloss et al. | Dec. 4, 1945 |
| 2,396,915 | Greidler et al. | Mar. 19, 1946 |

FOREIGN PATENTS

| Number | Country | Date |
|---|---|---|
| 548,197 | Great Britain | Sept. 30, 1945 |